United States Patent [19]

King et al.

[11] Patent Number: 4,670,155

[45] Date of Patent: Jun. 2, 1987

[54] PROCESS FOR SORPTION SOLUTE RECOVERY

[75] Inventors: C. Judson King, Kensington; Paul A. Sanchez, El Cerrito, both of Calif.

[73] Assignee: The Regents of the University of California, Berkeley, Calif.

[21] Appl. No.: 708,715

[22] Filed: Mar. 6, 1985

[51] Int. Cl.$^4$ .............................................. C02F 1/26
[52] U.S. Cl. .................................................... 210/689
[58] Field of Search ........................ 210/664, 689–692, 210/694

[56] References Cited

U.S. PATENT DOCUMENTS

| | | | |
|---|---|---|---|
| 2,422,504 | 6/1947 | Spence | 260/540 |
| 4,016,180 | 5/1977 | Baieri | 260/347.9 |
| 4,351,732 | 9/1982 | Psaras et al. | 210/689 |
| 4,356,262 | 10/1982 | Heady | 435/97 |
| 4,373,935 | 2/1983 | Ausikaitis et al. | 210/689 X |
| 4,382,001 | 5/1983 | Kulprathipanja et al. | 210/694 X |
| 4,450,294 | 5/1984 | Feldman | 562/608 |

FOREIGN PATENT DOCUMENTS 0081211  6/1983  European Pat. Off. .

OTHER PUBLICATIONS

"Production of Organic Acid Esters from Biomass-Novel Processes and Concepts", R. Datta, *Biotech and Bioeng.*, Symp. No. 11, 521–532 (1981).
"Acetic Acid Extraction", C. Judson King, *Handbook of Solvent Extraction*, pp. 567–573 (1983).
"Dehydration of Ethanol: New Approach Gives Positive Energy Balance", M. Ladisch et al., *Science*, vol. 205, pp. 898–900, (Aug. 31, 1979).

*Primary Examiner*—Tom Wyse
*Attorney, Agent, or Firm*—Majestic, Gallagher, Parsons & Siebert

[57] ABSTRACT

A process is provided in which an organic compound is separated from co-sorbed water directly on a particulate bed. Among the organic compounds which can be so separated and recovered from an aqueous solution are compounds containing the carboxylic group which can be converted to an ester during recovery. The inventive process may be used for the recovery of organic compounds from aqueous solutions such as fermentation broths.

14 Claims, No Drawings

PROCESS FOR SORPTION SOLUTE RECOVERY

FIELD OF THE INVENTION

This invention generally relates to the recovery of organic compounds on sorbent particulate beds, and more particularly to the recovery of organic compounds from aqueous solutions such as fermentation broths.

BACKGROUND OF THE INVENTION

The need for recovery of organic compounds from aqueous solutions occurs in the manufacture of organic chemicals in fermentation processes and from biologically produced organic compounds, such as via recombinant DNA, in manufacture of organic chemicals by conventional oxidation processes, and in the handling of some aqueous effluent streams. For example, organic compounds such as alcohols, aldehydes, ketones, ethers, carboxylic acids, esters, amines and the like, are often produced in these various manufactures and typically are dissolved as solutes in dilute aqueous solution.

Recovery of acetic acid from water has long been an important fluid separation, and known processes include liquid-liquid extraction, azeotropic distillation, and extractive distillation; however, there has usually been a large energy cost per unit of acetic acid recovered. Several conventional separation processes for acetic acid are surveyed by C. Judson King, *Handbook of Solvent Extraction*, "Acetic Acid Extraction", pp. 567-573 (1983).

Recovery of ethanol from dilute aqueous solutions has received particular attention recently in view of the potential feasibility of using a gasoline-anhydrous ethanol blend ("gasohol"). Various processes for obtaining ethanol from dilute aqueous solution are described in U.S. Pat. No.4,450,294, inventor Feldman, issued May 22, 1984.

Adsorption processes are coming into use for recovery of dissolved organic compounds from aqueous solution, especially for applications such as fermentation processes, since solvent extraction is complicated by the possibility of contamination of the aqueous stream by residual dissolved or emulsified solvent. Contamination is avoided in adsorption processes because of the insolubility of the solid, adsorbent phase. In such adsorption processes, water is necessarily taken up along with the dissolved organic compound because of competitive adsorption onto the surfaces, pore-filling, and hold-up in interstices. For example, adsorption of acetic acid from a 4 wt.% aqueous solution with activated carbon typically gives about 15% to 30% of acetic acid (with 85% to 70% being water) in the adsorbate, on a carbon-free basis.

Conventional regeneration processes typically entail leaching the retained adsorbate away from the adsorbent with a simple solvent (e.g. liquid methanol or acetone), or vaporization of the solute in water from the adsorbent bed by applying heat, reduced pressure, and/or a non-condensible carrier gas. Subsequent separation of co-adsorbed water from the desired organic compound and the solvent is then typically done by a series of conventional distillation steps. However, this can be difficult if the boiling point of the organic compound is close to that of water, if the organic compound forms an azeotrope with water, or if the organic compound is unstable at distillation temperatures. For example, acetic acid (b.p. 118° C.) and ethanol (b.p. 79° C.) have boiling points close to that of water. A number of the organic compounds of interest for recovery from aqueous solutions also have one or more of these properties, and thus are difficult to separate by conventional distillation.

SUMMARY OF THE INVENTION

In accordance with the present invention, there is provided a process by which water can be preferentially removed directly from a particulate bed on which the desired organic compound is sorbed, thereby accomplishing most or all of the separation of the organic compound from co-sorbed water in a simple and economical way.

In one aspect of the invention, a process useful for recovering an organic compound from an aqueous solution comprises providing a particulate bed having an initial sorbate thereon, the initial sorbate including water and the organic compound of interest, flowing a vapor phase into contact with the initial sorbate on the particulate bed to volatilize preferentially water from the initial sorbate, and removing the vapor phase, which has entrained water vapor, from the particulate bed. The resultant sorbate remaining on the bed may then be separated from the particulate bed by any of various means.

In another aspect of the present invention, a composition useful for recovery of a carboxylic acid or other substances containing the carboxylic group comprises adsorbent particles having a plurality of surface acidic sites and a precursor layer adsorbed on the particles and in contact with the acidic sites. The inventive composition is useful in recovery of a carboxylic acid by using the composition to form a bed. The bed is contacted with a vapor phase having an alcohol.

The inventive composition and process are particularly useful for the recovery of carboxylic acids resulting from fermentation.

DETAILED DESCRIPTION OF THE PREFERRED EMBODIMENT

Practice of one embodiment of the present invention permits the recovery of the organic compound in the form in which it is sorbed onto the particulate bed. For example, a carboxylic acid such as acetic acid would typically be recovered primarily as acetic acid (preferably ultimately as glacial acetic acid) when practicing the first embodiment of the present invention. This one embodiment will hereinafter be referred to as the "first" embodiment. Practice of another embodiment recovers a carboxylic acid or other substance containing the carboxylic group as a derivative. For example, a carboxylic acid such as lactic acid would typically be recovered as an ester. This embodiment will hereinafter be referred to as the "second" embodiment.

Both embodiments of the present invention can be practiced with conventional apparatus, such as vessels for holding the particulate beds, vapor source chambers and heaters, pumps, feed lines, condensers, and the like. The first embodiment of the present invention will first be fully described, followed by a full description of the second embodiment.

FIRST EMBODIMENT

The present invention utilizes a particulate bed of sorbent particles onto which an organic compound for which recovery is desired has been sorbed. Since for various suitable particulate materials the mechanism may be more one of absorption than adsorption, the term "sorption" and its cognates will be used to include both absorption and adsorption.

The sorbent particles should be thermally stable under the elevated temperatures at which the particles are exposed (due to contact with flowing vapor), preferably are of sufficiently large particle size so that vapor can flow through the particulate bed at a desired rate, and should have acceptably good sorbency for the organic compound to be recovered. It is also possible to practice the invention at lower temperatures by using vacuum distillation on the bed.

Suitable sorbents are available in many different particle sizes. For practice of the invention with fixed beds, it is desirable to utilize particles of a large enough size so that the pressure drop from the flowing vapor will not be too great. For carbons, it is preferred to use a pelletized carbon, or one of the larger granular carbons, rather than a powdered carbon. However, a powdered carbon could be used with a fluidized bed or where pressure drop along the bed is not a seriously limiting factor (or can be overcome by means such as pumping the vapor phase). Fluidized beds give substantial axial mixing, and this can remove much of the benefit of composition gradient which builds axially along a fixed bed.

Suitable sorbents include carbons and synthetic polymers (for example, cross-linked styrene divinylbenzene resins), and certain silicas, among others. Particulate carbons are especially preferred, and suitable particulate carbons having particle sizes of about 1-2 mm to facilitate vapor flow through the bed) are commercially available.

A process useful for recovering an organic compound from an aqueous solution in accordance with the present invention requires a sorbent particulate bed having an initial sorbate on particles of the bed. The sorbent particles of the bed can be made of various suitable materials such as carbons, synthetic polymers, certain silicas, or the like as already described. Pelletized carbon is particularly preferred, due to its thermal stability, sufficiently large particle size for good vapor flow and relatively low bed pressure drop, and its good sorbent capacity. As will be understood, however, a variety of materials and particle sizes are useful.

The initial sorbate is formed on the sorbent particles and includes the organic compound desired for recovery. Typically, an aqueous solution in which the organic compound is dissolved will be contacted with the sorbent particles under such conditions that at least a portion of the aqueous solution (including dissolved organic compound) sorbs or is otherwise taken up onto the sorbent particles. For example, a fermentation broth, after solids, yeasts or the like have been removed, may be fed through a vessel packed with the sorbent bed until the bed's sorption capacity is approached (with at least a portion of the aqueous solution having sorbed onto the particles).

As is to be understood, the quantities of sorbent particles constituting the particulate bed, contact time of the aqueous solution with the bed, and similar factors can vary widely. Optimum quantities, time, and the like will be determined for a given system by taking into account such factors as the concentration of organic compound in the aqueous solution, the volume of the aqueous solution, the concentrating capacity of the sorbent for the organic compound of interest, rate factors, and the like, as will be readily understood by those skilled in the art.

In any event, after sorption the organic compound will have a determinable, average weight ratio with respect to water on the particles. Practice of the first embodiment yields an increased ratio of organic compound with respect to water on the particles, since water is removed. For example, acetic acid concentrations from various manufacturing processes typically range from about 0.5 wt.% to about 25 wt.%. Sorption of acetic acid from such acetic acid solutions does typically concentrate the acetic acid, but considerable water nevertheless remains in the sorbate. Practice of the first embodiment removes a substantial amount of this water.

A vapor phase is flowed into contact with the initial sorbate on the particulate bed. This vapor phase includes a volatilized compound which is condensible in the initial sorbate during contact therewith. The condensibility of the volatilized compound is believed important to promote the sorbed solution's non-idealities and to enhance the activity coefficient of water more than that of the organic compound's activity coefficient. The volatilized compound should have a sufficiently low volatility so that it will enter the initial sorbate (that is, condense) during contact, but should have a high enough volatility so that it will not flash the initial sorbate off of the bed non-selectively. Although immiscibility is not necessary, if the vaporized compound forms two liquid phases upon condensation of the effluent vapor (removed from the particulate bed), this tends to enhance subsequent separations. However, there should be sufficient miscibility so that the above-mentioned non-idealities will occur in the liquid phase.

The vaporized compound preferably has a latent heat of vaporization greater than about 130 calories per milliliter of liquid volume. This value (latent heat of vaporization of the volatilized compound per unit liquid volume) is preferred because the ratio of the (liquid) volume of the volatilized compound condensed onto the bed per (liquid) volume of water removed during practice of the invention will be nearly equal to the inverse ratio of the latent heats of vaporization per unit (liquid) volume for the two substances. Since water has a very high latent heat per unit volume, this means that there tends to be an increase in the volume of liquid on the bed as the volatilized compound condenses adiabatically in replacing vaporizing water. That is, the bed will tend to flood after a period of flowing if the latent heat of vaporization for the volatilized compound is less than about 130 calories per milliliter of liquid volume.

Suitable compounds for use as the volatilized compound in the invention include alcohols having from one to about five carbons (e.g. methanol, ethanol, the propanols, the butanols and the pentanols), and various others, such as acetonitrile and dimethylformamide. Particularly preferred compounds for use as the volatilized compound of the flowed vapor phase include methanol (208 calories per milliliter of liquid volume) and ethanol (161 calories per milliliter of liquid volume).

The temperature of the vapor phase varies during the flowing due to the entrainment of volatilized water as the vapor phase passes through and out of the bed, but will typically be at least equal to the boiling point of the volatilized compound as the vapor phase enters the bed. The volatilized compound which is flowed into contact with the initial sorbate on the particulate bed preferentially volatilizes water from the initial sorbate and entrains water vapor in the flowing vapor phase. That is, the volatilized compound enhances the volatility of water relative to that of the organic compound and preferentially entrains water vapor. The flowing is continued for a sufficient, or desired, period of time to form a resultant sorbate on the sorbent particles of the bed. The resultant sorbate has a weight ratio of organic compound to water increased with respect to that of the initial sorbate.

Typically, the flowing will be conducted upwardly through a fixed bed, and vapor phase having entrained water vapor will be continuously removed from the top of the particulate bed until substantial amounts of volatilized organic compound begin to appear. Upward flowing is preferred, since downflow tends to reduce the selectivity of water removal.

When the proportion of organic compound to water in the distillate (that is, effluent vapor) being removed increases, one can simply stop flowing the volatilized compound into the bed. The organic compound, or resultant sorbate, can then be separated from the bed by various means. For example, normal leaching with a liquid solvent can be used to separate the resultant sorbate from the particulate bed. Alternatively, the resultant sorbate may be separated from the particulate bed by use of heat, reduced pressure, a non-condensible carrier gas and/or by continued use of the condensible carrier, with the effluent diverted to a different receiver.

Following practice of the invention, the particulate bed may be drained, purged with air or inert gas, and subjected to distillative regeneration for subsequent reuse. Thus, although runs through one particulate bed are semi-continuous, a plurality of beds may be used with appropriate switching to provide a substantially continuous recovery process.

Aspects of the inventive process are hereinafter illustrated by recovery of acetic acid; however, it should be understood that practice of the invention is useful for recovering a variety of organic compounds, and particularly for recovering various carboxylic acids, ketones, ethers, esters, aldehydes, and alcohols. Organic compounds for recovery preferably have a boiling point similar to that of water, for example from about 50° C. to about 170° C. Alternatively, they may form azeotropes with water.

Table IA, below, sets out an effluent vapor's composition versus time in practice of the first embodiment (where methanol was the volatilized compound and acetic acid was the organic compound). The mass of particles forming the particulate bed was about 51 grams, the particles utilized were Witco Columbia carbon (8×10 mesh, about 1 wt.% oxygen), and the flow rate through the bed was about 4.0 ml/min (where milliliters refer to the volume of effluent vapor after recovery and condensation). Example I, below, describes the procedure which was used to prepare the particulate bed for the run illustrated by the Table IA and Table IB data.

EXAMPLE I

Witco Columbia carbon was soaked in water for 24 hours, drained and then dried in a vacuum oven for 24 hours. The carbon particles were equilibrated with 10 ml dilute acetic acid solution per gram carbon for 24 hours. The acetic acid concentration in the aqueous solution before sorption was about 5% (w/w) and was about 22 wt.% of the initial sorbate (on a carbon-free basis) after sorption. The carbon particles were then centrifuged for 15 minutes to remove interstitial liquid. A column was prepared (a vacuum-jacketed vessel with an I.D. of 2.8 cm which was subsequently packed to a height of 28 cm with the sorbent particles) by boiling methanol slowly through the apparatus for 2 to 3 hours. The vessel was then charged with the centrifuged carbon particles having the initial sorbate thereon. Compositions of the effluent vapor were measured by gas chromatography with a thermal-conductivity detector and either a one foot or a five foot Porapak Q column.

The carbon bed was brought to saturation temperature, with the effluent vapor's temperature being about 95° C. at the commencement of the run and being about 73° C. after 60 minutes. The measured constituent of mass balances for water and acetic acid were as follows:

|  | Water (g) | Acetic Acid (g) |
|---|---|---|
| Total initially on bed: (50.5 g carbon, dry) | 33.2 | 9.59 |
| Amount remaining on bed: | 6.18 | 4.21 |
| Amount in cumulative effluent vapor: | 24.0 | 2.78 |
| Amount remaining in vapor source flask: | 0.59 | 1.72 |
| Total amount recovered: | 30.86 | 8.71 |

As can be seen by the above data, 78% of the water originally present in the initial sorbate was preferentially removed as effluent vapor.

TABLE IA

| Time (min) | Effluent Vapor Acetic Acid | Composition (wt. %) Water | Methanol |
|---|---|---|---|
| 5 | 2 | 33 | 65 |
| 10 | 2 | 30 | 68 |
| 15 | 2 | 20 | 78 |
| 20 | 1 | 14 | 85 |
| 25 | 1 | 10 | 89 |
| 30 | 1 | 10 | 89 |
| 35 | 0.9 | 9 | 90 |
| 60 | 0.9 | 4 | 95 |

As the run progressed from which the Table IA data was taken, the temperature of effluent vapor dropped. This is shown by the data of Table IB, below.

TABLE IB

| Time (min) | Effluent Vapor Temp. (°C.) | Cumulative Volume (ml) |
|---|---|---|
| 5 | 95 | — |
| 10 | 90 | 18 |
| 15 | 83 | 30 |
| 20 | 80 | 56 |
| 25 | 78 | 63 |
| 30 | 77 | 83 |
| 35 | 76 | 108 |
| 60 | 73 | 210 |

The water concentration in effluent vapor of the run illustrated by Example I (and corresponding Tables IA and IB) was about 10 times that of acetic acid during the first 30 minutes. Later in the run (when the water concentration in the sorbate had decreased substantially), the concentration of water was about 5 times that of acetic acid. Thus, preferential separation of water from acetic acid was demonstrated, especially during the first about 30 minutes when the bulk of the water was removed. The overall closures were about 93% for water and about 91% for acetic acid.

These results suggest that practice of the inventive process may desirably be performed so that the vaporized compound is flowed through the bed for the period of time during which water comes off in high concentration into the effluent vapor. Later, when water tends to be in lower concentration and the proportion of organic compound to water in the effluent vapor tends to increase, one may wish to switch simply to leaching with a liquid solvent. Such a liquid solvent could be the same as the vaporized compound (albeit in liquid form), or could be a different compound.

Example II (and its corresponding Table II) illustrates the reason for preferring a latent heat of vaporization greater that about 130 calories per milliliter of liquid volume for the volatilized compound.

EXAMPLE II

A carbon bed was prepared in a manner analogous to that of Example I, but with the mass of particles forming the particulate bed being 69 grams. Acetone was the volatilized compound, and the flow rate through the bed was about 2.3 ml/min. The measured mass balances for water and acetic acid were as follows.

|  | Water (g) | Acetic Acid (g) |
|---|---|---|
| Amount initially on carbon: | 42.30 | 12.15 |
| Amount remaining on bed: | 10.98 | 3.21 |
| Amount in Cumulative effluent vapor: | 12.65 | 0.12 |
| Amount remaining in vapor source flask: | 15.59 | 10.73 |
| Total amount recovered: | 39.22 | 14.06 |

The overall closures of the mass balances were satisfactory (93% for water and 116% for acetic acid). However, the recovery of water in the effluent vapor was relatively low (about 30%) when compared with the 78% removal of water in Example I. In addition, there was build-up of liquid on the bed and the bed tended to flood. Additional insulation did not appear to provide benefit. Table II, below, sets out the effluent vapor's composition versus time to illustrate further the Example II run.

TABLE II

| Time (min) | Effluent Vapor Acetic Acid | Composition (wt. %) Water | Acetone |
|---|---|---|---|
| 5 | — | 6.5 | 93.5 |
| 10 | — | 7.5 | 92.5 |
| 15 | 0.3 | 9.4 | 90.3 |
| 20 | — | 8.3 | 91.7 |
| 25 | — | 7.3 | 92.7 |
| 30 | — | 7.0 | 93.0 |
| 35 [bed drained] | — | 7.0 | 93.0 |
| 60 | — | 7.3 | 92.7 |

It is believed that the build-up of liquid was due to condensation of a large amount of vaporized acetone in order to provide the latent heat required to vaporize the inital adsorbate on the bed. That is, it is believed that the latent heat of vaporization for acetone (about 100.5 calories/milliliter liquid volume) is lower than would usually be preferred in practice of the invention. Nearly 5.4 volumes of acetone must condense to vaporize one volume of water, adiabatically. It is believed that the volume of the bed interstices would usually not be sufficient to accommodate this amount of liquid in practical use.

SECOND EMBODIMENT

The second embodiment of this invention provides a process for recovery of carboxylic acids and other substances containing the carboxylic group—e.g., amino acids, lactic acid and related compounds, vanillic acid and related compounds, and the like—hereinafter referred to as "carboxylic-containing compounds".

There are a number of carboxylic acids that are of commercial interest as fermentation products. These include malic, fumaric, succinic, citric, propanoic, lactic, pyruvic, maleic, and malic. The esters of such carboxylic acids may be desired as the ultimate product for recovery (or be desired as intermediates with the carboxylic acids later being regenerated or other analogs being produced). For example, many of these acids have low volatility and cannot readily be stripped or extracted from an adsorbent bed. Also, the ester may sometimes be more valuable than the corresponding carboxylic acid.

Practice of the second embodiment for this invention is analogous to practice of the first embodiment, but differs in providing for the recovery of a carboxylic-containing compound in its ester form as a reaction product. For example, where a carboxylic acid is adsorbed upon a bed of adsorbent particles and is contacted in accordance with the present invention with an alcohol, then an ester is the reaction product. Thus, it is the reaction product (as derivative), rather than the original carboxylic acid of the initial adsorbate, which may be recovered from the particulate bed.

The adsorbent particles will preferably have a plurality of acidic sites on their surfaces. As may be understood, these sites are thus proximate to the initial adsorbate. Since formation of the reaction product during practice of the second embodiment is believed to be primarily a surface phenomenon, the term "adsorption" and its cognates will be used in describing the second embodiment.

Acidic sites on the adsorbent particles can be formed, for example, by oxidizing commercially available carbons by use of various oxidizing agents such as chlorosulfonic acid, nitric acid, hydrogen peroxide, ozone, a the like. Oxygen (at elevated temperature) or other oxidizing gases are also possibilities. The adsorbent particles in the second embodiment preferably include carbon having an oxygen content of at least about 4 wt.%, more preferably greater than about 7 wt.%, when oxygen-containing groups are the source of the acidity. Oxygen content of from about 1 wt.% to less than about 4 wt.% have not been found to provide good conversions, even at low flow rates.

Compositions useful for recovery of a carboxylic-containing compound in practice of the second embodiment process preferably are formed by providing carbon particles, oxidizing the carbon particles, and contacting the oxidized carbon particles with a carboxylic acid under such conditions that at least a portion of the carboxylic acid is carried on surfaces of the oxidized carbon particles. A variety of conventional methods may be utilized for obtaining the initial adsorbate on the adsorbent particles. For example, the contacting may be by adsorbing an aqueous solution having the carboxylic acid dissolved therein onto the oxidized carbon particles simply by flowing a liquid stream of aqueous solution having the carboxylic acid dissolved therein through a fixed bed of the particles, or the contacting may be by spraying in a granulator.

Although the second embodiment is analogous to the first, without sufficient acidic sites on the particulate bed there typically will be little or no reaction product formed. Thus, during a number of experiments where the organic compound was a carboxylic acid and the volatilized compound was an alcohol, at best only a very small amount of ester as a reaction product was obtained at very low flow rates (about 1 ml/min) when carbon particles had about 1 wt.% oxygen. Thus, for example, with acetic acid as the organic compound and methanol as the volatilized compound, only about 0% to about 4% of the acetic acid initially on the bed was converted to methyl acetate. In runs with acetic acid as the organic compound and ethanol as the volatilized compound, only about 0% to about 2% of the acetic acid on the bed was converted to ethyl acetate.

By contrast, when the particulate bed has been sufficiently oxidized, practice of the second embodiment has provided over 24% conversion of carboxylic acid to ester as reaction product.

Suitable alcohols for use in the second embodiment process include those with one to six carbon atoms. This includes alcohols such as methanol, ethanol, and normal and iso butanol, etc.

Example III, below, illustrates preparation of an inventive composition useful for recovery of a carboxylic-containing compound.

Although aspects of the inventive composition and process are hereinafter illustrated by the recovery of acetic acid as methyl acetate, it should be understood that practice of the invention is useful for recovering a variety of carboxylic-containing compounds as their corresponding esters, and particularly for recovering various carboxylic acids in their ester form.

EXAMPLE III

Carbon particles (Witco Columbia, 8×10 mesh, 1.16 wt.% oxygen, 150 ml) were placed into a 250 ml round bottom flask, covered with 70% nitric acid and gently heated for 2 hours. The carbon particles were then drained of excess solution and washed. The washed carbon particles were dried for 24 hours at 60° C. under vacuum (20 mm Hg). Analysis of the carbon particles showed 4.69 wt.% oxygen. The carbon particles were again placed in a 250 ml round bottom flask, covered with 70% nitric acid and let sit for 8 hours at room temperature. Excess liquid was drained, and the carbon particles were repeatedly washed with water. The carbon particles were dried at 60° C. under vacuum (20 mm Hg) for 24 hours. Analysis showed 7.72 wt.% of oxygen.

A carboxylic acid solution was prepared in which 37 ml of glacial acetic acid was mixed with 500 ml of distilled water. (7.15 wt.% acetic acid). 120 ml of the oxidized carbon particles were then admixed with the dilute acetic acid solution and placed in a shaker bath at 30° C. for 24 hours. The particles having initial adsorbate thereon (of which acetic acid was 22.45 wt.%) were then drained, centrifuged at 2400 rpm for 5 minutes, and were ready for use in the second embodiment process.

The composition prepared as described in Example III was then packed into a column, and vaporized methanol was upflowed through the column at a flow rate of about 4.3 ml/min (wherein milliliter refers to the volume of effluent vapor after it has been condensed). A 24% conversion of the adsorbed acetic acid to methyl acetate was obtained.

It is believed that the conversion, or formation of reaction product, in practice of the second embodiment process is dependent upon residence time of the vapor, and thus a decreased vapor flow rate will tend to increase conversion. Accordingly, smaller particle sizes than the about 1–2 mm sized particles used to illustrate the invention in Example III may be desirable in some applications.

As with practice of the first embodiment process, the reaction product (e.g. ester) may then be recovered from the bed by means such as vaporization or solvent leaching. In many instances, practice of the second embodiment process rather than the first may be preferable for recovery of the original organic compound. For example, lactic acid decomposes at temperatures required for removal by vaporization and is so highly polar that it cannot readily be extracted with common solvents. However, the methyl, ethyl, propyl and butyl esters of lactic acid have boiling points below about 190° C., and these esters are sufficiently stable to permit recovery by vaporization. Also, these esters are sufficiently less polar than lactic acid so that they can much more readily be recovered from the bed by solvent leaching.

While the invention has been described in connection with specific embodiments thereof, it will be understood that it is capable of further modification, and this application is intended to cover any variations, uses or adaptations of the invention following, in general, the principles of the invention and including such departures from the disclosure as come within the known or customary practice in the art to which the invention pertains and as may be applied to the essential features hereinbefore set forth, and as fall within the scope of the invention and the limits of the appended claims.

What is claimed:

1. A fixed bed process for removing water from an organic compound comprising:
    forming a bed of sorbent particles having an initial sorbate thereon, the initial sorbate including an aqueous solution having an organic compound dissolved therein, the initial sorbate having a determinable weight ratio of organic compound to water; and
    flowing a volatilized compound through the bed and removing a vapor phase from the bed, the vapor phase including water vapor, the volatilized compound enhancing the volatility of water relative to that of the organic compound and preferentially entraining water vapor in the flow of volatilized compound through the bed, the volatilized compound having a latent heat of vaporization greater than about 130 calories per milliliter of liquid volume, and the organic compound having a boiling point of from about 50° C. to about 170° C., the flowing continued for a sufficient period of time to form a resultant sorbate on the sorbent particles of the bed which has a weight ratio of organic compound to water increased with respect to that of the initial sorbate.

2. The process as in claim 1 wherein at least a portion of the volatilized compound condenses in the initial sorbate during the flowing.

3. The process as in claim 1 further comprising:

separating the resultant sorbate from the bed after the flowing.

4. The process as in claim 1 or 3 wherein:
the organic compound is a carboxylic acid, a ketone, an ether, an ester, an aldehyde, or an alcohol.

5. The process as in claim 4 wherein:
the volatilized compound includes methanol, ethanol, a propanol, a butanol, a pentanol, or mixtures thereof.

6. The process as in claim 4 wherein the aqueous solution is a product of fermentation or is biologically produced.

7. A process useful for recovery of a carboxylic-containing compound from an aqueous solution comprising:
forming a bed of adsorbent particles having an initial adsorbate thereon, the initial adsorbate including an aqueous solution in which a first carboxyliccontaining compound is dissolved, the adsorbent particles having a plurality of acidic sites on surfaces thereof; and,
flowing a vapor phase into contact with the bed, the vapor phase including an alcohol therein, the first carboxylic-containing compound and the alcohol of the vapor phase forming a second carboxylic-containing compound as a reaction product therefrom.

8. The process as in claim 7 further comprising:
recovering the reaction product from the bed.

9. The process as in claim 8 wherein:
the vapor phase is flowed through the bed, and the recovering includes continuing the flowing for a sufficient time to volatilize the reaction product and to entrain said product into the flow.

10. The process as in claim 7 or 9 wherein the vapor phase has an alcohol therein, the first carboxylic-containing compound is a carboxylic acid selected from the group consisting of malic, fumaric, succinic, citric, propanoic, lactic, pyruvic, maleic, and acetic, and the reaction product is an ester of the carboxylic acid.

11. The process as in claim 8 wherein the reaction product is an ester.

12. The process as in claim 7 including oxidizing the adsorbent particles before forming the bed having initial adsorbate thereof.

13. The process as in claim 12 wherein the adsorbent particles include carbon.

14. The process as in claim 13 wherein the carbon has an oxygen content of at least about 4 wt.%.

* * * * *